United States Patent
Deshpande et al.

(10) Patent No.: US 9,632,933 B2
(45) Date of Patent: Apr. 25, 2017

(54) EFFICIENT COHERENCY RESPONSE MECHANISM

(71) Applicant: FREESCALE SEMICONDUCTOR, INC., Austin, TX (US)

(72) Inventors: Sanjay R. Deshpande, Austin, TX (US); John E. Larson, Round Rock, TX (US); Fernando A. Morales, Austin, TX (US); Thang Q. Nguyen, Austin, TX (US)

(73) Assignee: NXP USA, Inc., Austin, TX (US)

( * ) Notice: Subject to any disclaimer, the term of this patent is extended or adjusted under 35 U.S.C. 154(b) by 176 days.

(21) Appl. No.: 14/612,861

(22) Filed: Feb. 3, 2015

(65) Prior Publication Data

US 2016/0224468 A1  Aug. 4, 2016

(51) Int. Cl.
| | |
|---|---|
| *G06F 12/00* | (2006.01) |
| *G06F 12/0815* | (2016.01) |
| *G06F 12/0813* | (2016.01) |
| *G06F 12/0831* | (2016.01) |

(52) U.S. Cl.
CPC ...... *G06F 12/0815* (2013.01); *G06F 12/0813* (2013.01); *G06F 12/0831* (2013.01); *G06F 2212/1016* (2013.01); *G06F 2212/1048* (2013.01); *G06F 2212/154* (2013.01); *G06F 2212/621* (2013.01)

(58) Field of Classification Search
CPC ... G06F 12/00; G06F 12/0806; G06F 12/0815
USPC ................ 711/100, 141, 146, 154
See application file for complete search history.

(56) References Cited

U.S. PATENT DOCUMENTS

| | | | | |
|---|---|---|---|---|
| 5,495,419 A | * | 2/1996 | Rostoker | G06F 17/5072 700/121 |
| 5,659,710 A | | 8/1997 | Sherman et al. | |
| 5,963,975 A | * | 10/1999 | Boyle | G06F 12/0817 711/117 |
| 6,249,802 B1 | | 6/2001 | Richardson et al. | |
| 6,442,597 B1 | | 8/2002 | Deshpande et al. | |
| 2009/0164737 A1 | * | 6/2009 | Deshpande | G06F 12/0828 711/141 |

(Continued)

OTHER PUBLICATIONS

Zhang et al, "Dynamic Analysis of the Relay Cache-Coherence Protocol for Distributed Transactional Memory", IEEE International Symposium on Parallel & Distributed Processing (IPDPS), Apr. 19-23, 2010, 15 pages, Atlanta, GA.

(Continued)

*Primary Examiner* — Tuan Thai

(57) ABSTRACT

A plurality of processing units are interconnected by a coherency network in accordance with a directed spanning tree. Each processing unit that is a leaf of the directed spanning tree includes processing circuitry to provide a coherency response in response to a snoop request. Each processing unit which is not a root or leaf of the directed spanning tree includes switch point circuitry having one or more ingress ports coupled to neighboring processing units in accordance with the directed spanning tree. The switch point circuitry includes a coherency tracking table configured to store a combined coherency response in response to a particular snoop request based on one or more coherency responses received at the one or more ingress ports from the neighboring processing units.

17 Claims, 7 Drawing Sheets

(56) References Cited

U.S. PATENT DOCUMENTS

2010/0110934 A1    5/2010  Li et al.
2012/0317362 A1*  12/2012  Hendry ............... G06F 12/0831
                                              711/130

OTHER PUBLICATIONS

Lodde et al, "Heterogeneous NoC Design for Efficient Broadcast-based Coherence Protocol Support", Sixth IEEE/ACM International Symposium on Networks on Chip (NoCS), May 9-11, 2012, pp. 59-66, Copenhagen.

* cited by examiner

COHERENCY TRACKING TABLE 500

| | VALID 510 | LOCAL 515 | WEST 520 | EAST 525 | NORTH 530 | SOUTH 535 | COMBINED RESPONSE 540 |
|---|---|---|---|---|---|---|---|
| | NEW ENTRY 555 | | | | | | |
| 545(3) | 1 | 1 | - | 0 | 1 | 0 | RESPONSE C |
| 545(2) | 1 | 1 | - | 0 | 1 | 0 | RESPONSE B |
| 545(1) | 1 | 1 | - | 1 | 1 | 0 | RESPONSE A |

ENTRIES 545(1)-545(N)

SNOOP ORDER 550

FIG. 5

COHERENCY TRACKING TABLE 700

| VALID 510 | LOCAL 515 | WEST 520 | EAST 525 | SOUTH 535 | COMBINED RESPONSE 540 |
|---|---|---|---|---|---|
| NEW ENTRY 755 | | | | | |
| ⋮ | | | | | |
| 745(3) 1 | 1 | 0 | 0 | - | RESPONSE Z |
| 745(2) 1 | 1 | 0 | 1 | - | RESPONSE Y |
| 745(1) 1 | 1 | 0 | 1 | - | RESPONSE X |

ENTRIES 745(1)-745(N)

SNOOP ORDER 750

EFFICIENT COHERENCY RESPONSE MECHANISM

BACKGROUND

Field

This disclosure relates generally to coherency protocol responses, and more specifically, to efficient combination and transmission of coherency protocol responses.

Related Art

In shared memory systems, multiple processors are able to share a common memory space. Since each processor is capable of reading and writing to the common memory space simultaneously with the other processors, it is important to maintain memory coherence of the common memory space in order to avoid invalid data being utilized by the processors. A shared memory system often implements a coherency protocol to maintain memory coherence, or consistency of the data stored in the common memory space.

BRIEF DESCRIPTION OF THE DRAWINGS

The present invention may be better understood, and its numerous objects, features, and advantages made apparent to those skilled in the art by referencing the accompanying drawings.

FIG. 5 illustrates a block diagram depicting an example coherency tracking table, according to some embodiments.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Memory coherence is often maintained in a shared memory system, such as a distributed shared memory system having one or more memories shared by a number of processors, by implementing a coherency protocol on devices in the shared memory system. One type of coherency protocol uses a "snooping" approach, where a processor that is preparing to access (e.g., read or write) data of the shared memory space will broadcast a "snoop" request to the other processors, which in turn will "snoop" or monitor their caches or other portion of the shared memory space to see whether they have a copy of the data.

Conventionally, each processor responds directly to a central location in the system with a coherency response. The set of coherency responses for a given data transaction (e.g., read or write) are often combined at the central location and communicated to the processor involved in the data transaction. However, since each processor responds separately for each data transaction, the large number of coherency responses being transmitted may cause congestion in the system, which in turn increases the wait time for the coherency responses to be received at the central location and negatively impacts system performance.

Further, as the number of processors and the number of distinct shared memories in the shared memory system are increased, the number of coherency responses transmitted in the system sharply increases, causing further congestion in the system. As such, snooping coherency protocols are generally difficult to scale up as the size of the system increases.

The present disclosure provides an efficient combination and transmission mechanism for coherency responses in a shared memory system, such as a distributed cache-coherent multi-processor computing system. Coherency responses from "snooper" nodes (such as core processors or other network devices that perform snooping when responding to a snoop request or coherency request) travel along branches of a specialized or directed spanning tree to an ordering point (or central location). As coherency responses flow down the tree from the responding processors to the ordering point, the coherency responses are combined at switch points along the way, resulting in fewer coherency responses being transmitted in the system, reducing congestion, and improving the scalability of snooping coherency protocols.

Example Embodiments

Figure 1:
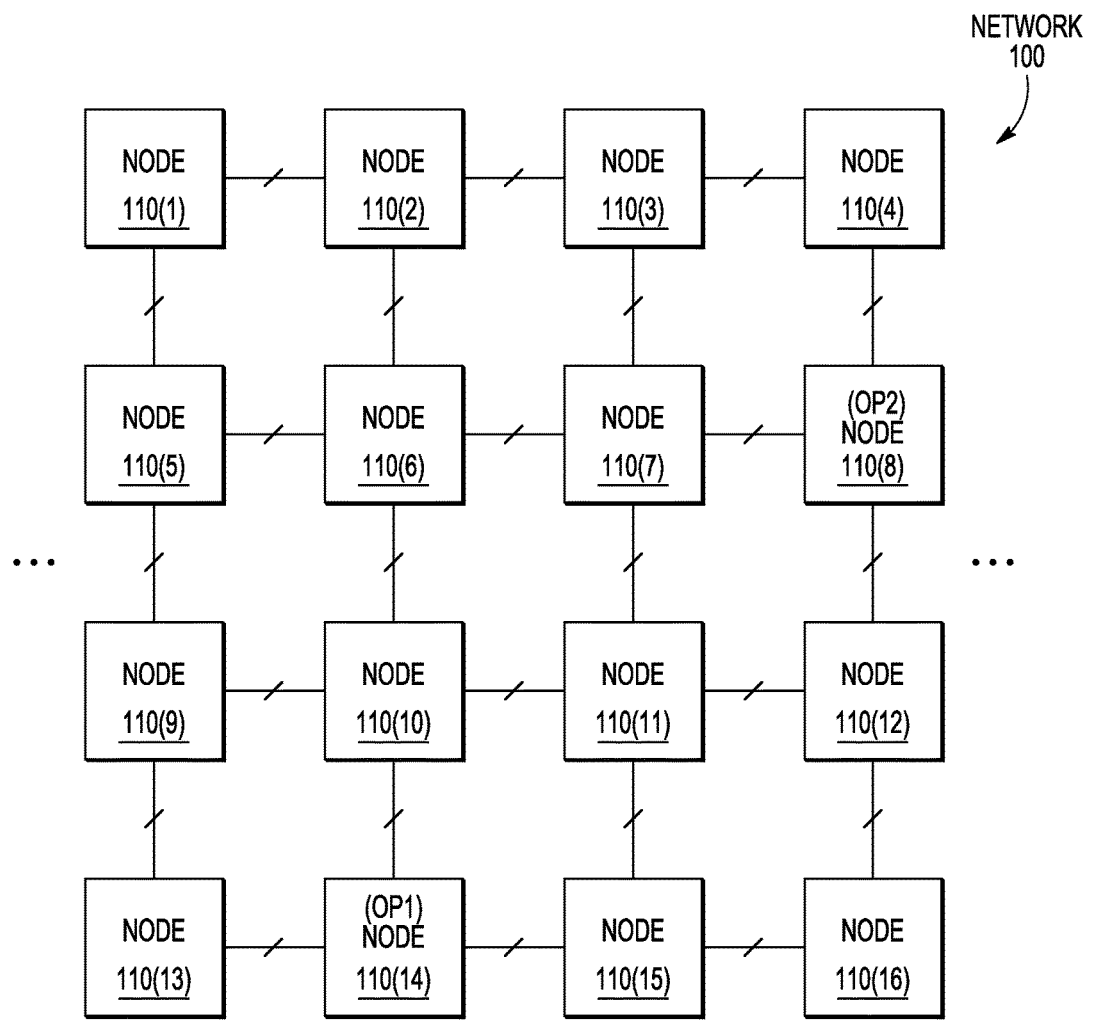
FIG. 1 illustrates a block diagram depicting an example coherency network in which the disclosure is implemented, according to some embodiments.

FIG. 1 illustrates a block diagram depicting an example coherency network 100 in which the disclosure is implemented. Coherency network 100 is a multi-processor network that implements a coherency protocol to maintain memory coherence of a shared memory space. Coherency network 100 includes a shared memory space (not shown) and one or more network nodes 110(1)-110(N), where nodes 110(1)-110(16) are illustrated in FIG. 1. Nodes 110(1)-(N) are connected by a number of interconnection links, illustrated in FIG. 1 as a connecting line having a hash mark. Each interconnection link includes a number of wires or electrical connections (e.g., a bus) over which coherency messages (e.g., requests and responses) are transmitted from node to node. Each interconnection link may also include additional buses for other communication aspects of nodes 110, such as a data bus or address bus.

Coherency network 100 includes one or more coherency networks, where each coherency network includes a distinct shared memory space for which memory coherence is being maintained. If present, each coherency network includes a subset of nodes 110, which includes up to all nodes 110(1)-(N), indicating that some networks will include overlapping sets of nodes. Nodes 110 are configured to share access to the one or more distinct shared memory spaces of coherency network 100. In some embodiments, different subsets of nodes are configured to access different ones of the distinct shared memory spaces in coherency network 100. In other embodiments, all nodes are configured to access each of the distinct shared memory spaces in coherency network 100.

Examples of coherency network 100 include, but are not limited to, one or more shared memory systems, such as a distributed shared memory system having a distributed or decentralized interconnection topology, such as a mesh network topology. While each node 110 is coupled to four neighboring nodes 110 (e.g., adjacent or next-hop nodes) in an interconnected mesh in FIG. 1, each node 110 may be coupled to fewer or additional neighboring nodes 110 in other embodiments having a distributed interconnection topology.

Figure 4:
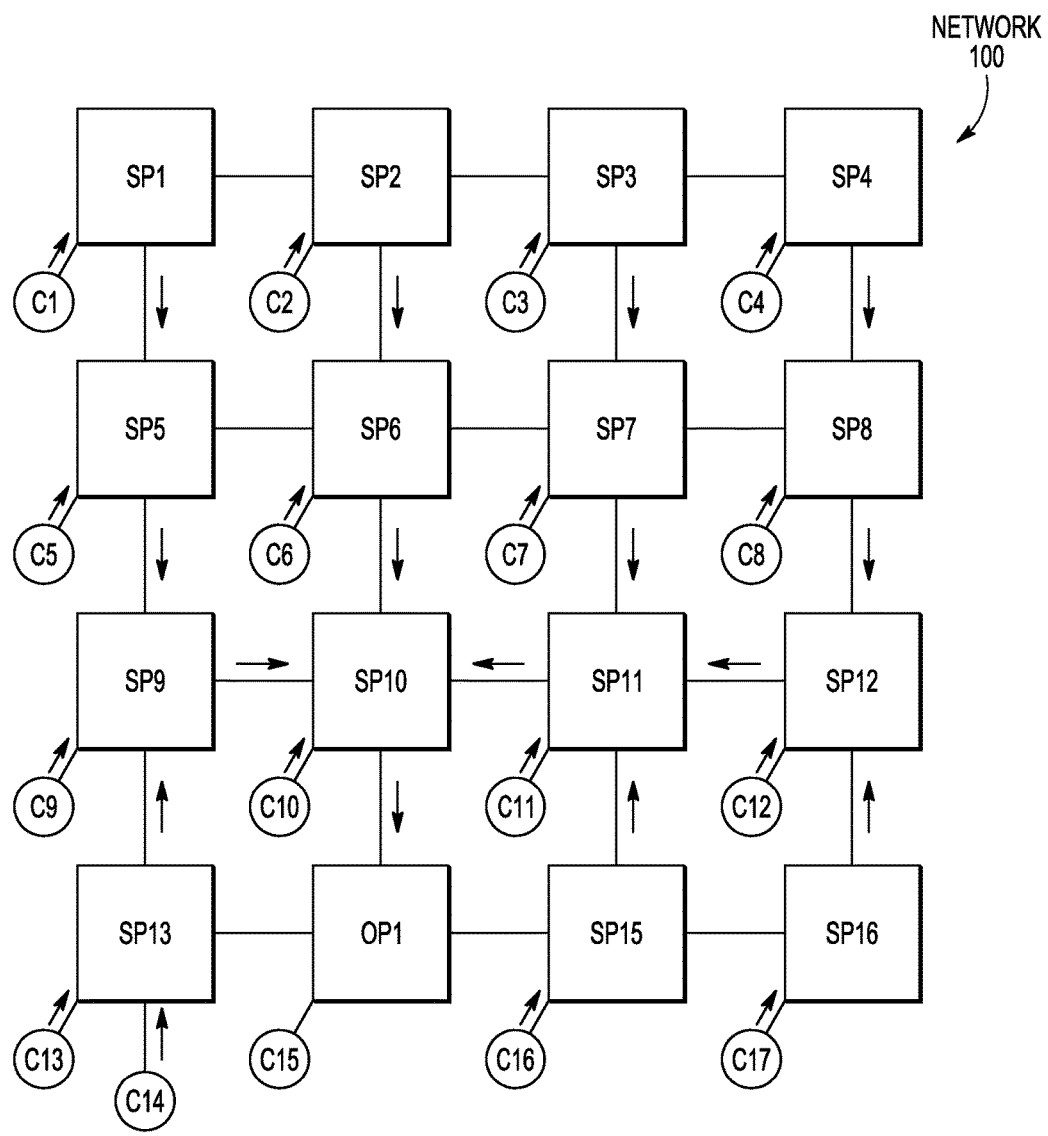
FIG. 4 illustrates a block diagram depicting an example directed spanning tree implemented in a coherency network, according to some embodiments.
Figure 6:
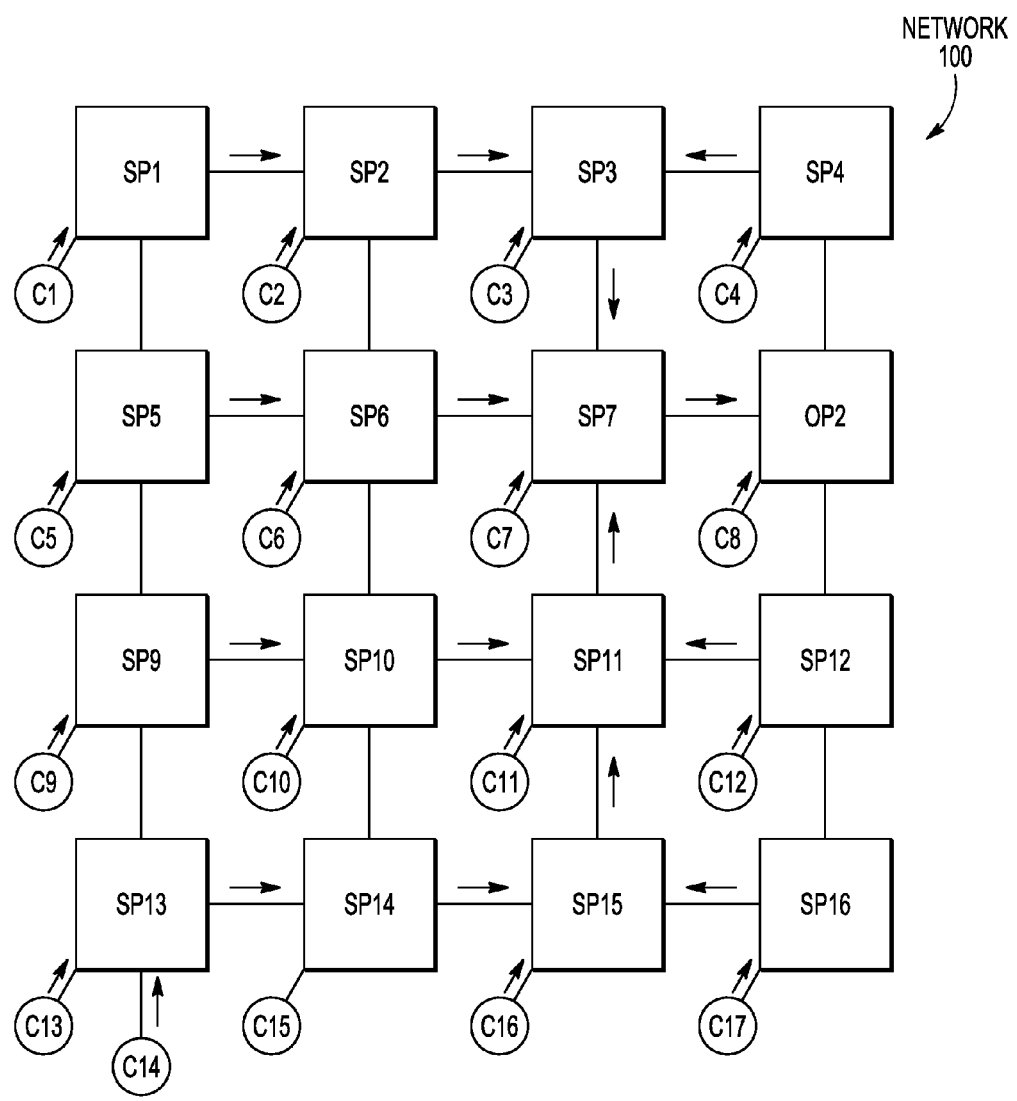
FIG. 6 illustrates a block diagram depicting another example directed spanning tree implemented in a coherency network, according to some embodiments.

The present disclosure provides for implementing an efficient combination and transmission mechanism for coherency responses, which includes implementing a directed spanning tree that spans a number of nodes in coherency network 100, where one of the nodes in coherency network 100 serves as a root of the tree. In embodiments where coherency network 100 includes multiple coherency networks, each coherency network is associated with a directed spanning tree. The directed spanning tree defines one or more ingress interfaces of each node on which coherency responses are received and an egress interface of each node on which a combined coherency response is forwarded toward the root of the tree. In the embodiment illustrated in FIG. 1, node 110(14) is presently used as an ordering point (OP1) or root of a directed spanning tree for network 100 that includes nodes 110(1)-(16). An example of a directed spanning tree rooted at OP1 is illustrated in FIG. 4. Similarly, node 110(8) serves as another ordering point (OP2) for another directed spanning tree, which may be used alternatively to the directed spanning tree illustrated in FIG. 4 for network 100 or may be associated with another coherency network within network 100. An example of a tree rooted at OP2 is illustrated in FIG. 6.

Each node 110 also implements coherency response combination and transmission logic. Each node 110 is configured to accumulate or collect a set of coherency responses that are responsive to a particular outstanding snoop request, where each coherency response is received on an ingress interface from a neighboring node (also referred to as a neighboring ingress node), as defined by the directed spanning tree for that particular coherency network. Coherency responses remain within the coherency network in which the outstanding snoop request originated. Node 110 combines the set of received coherency responses into a single combined response that is responsive to the same outstanding snoop request. Once all expected coherency responses are received on the ingress interfaces defined by the directed spanning tree, node 110 forwards the combined response on an egress interface (which is coupled to an egress neighboring node) directed toward the root of the tree. Node 110 is discussed in further detail below in connection with FIG. 2.

Figure 2:
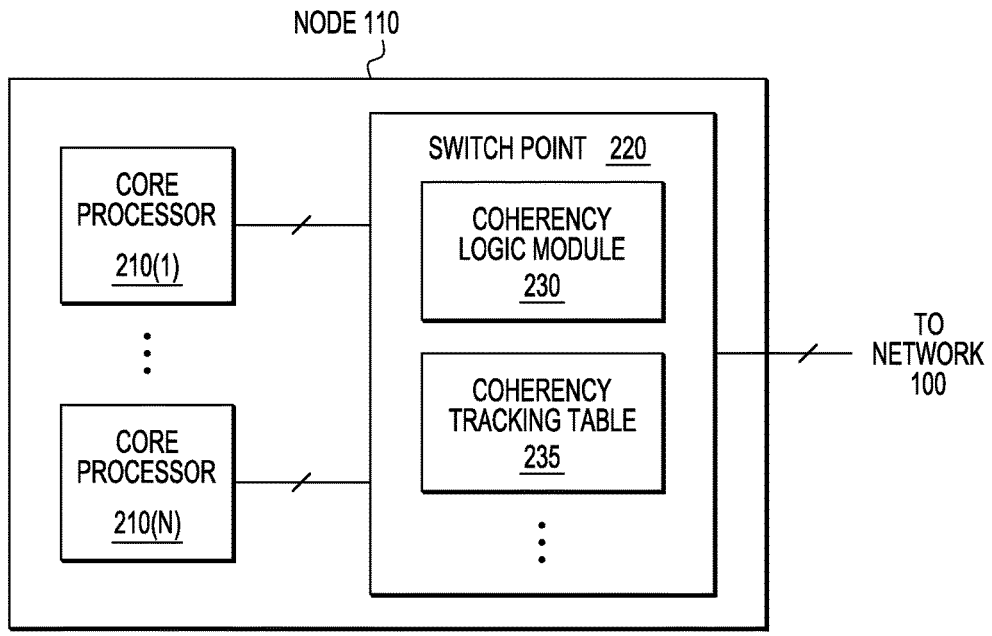
FIG. 2 illustrates a block diagram depicting an example node of a coherency network in which the disclosure is implemented, according to some embodiments.

FIG. 2 illustrates a block diagram depicting an example node 110 of a coherency network in which the disclosure is implemented. Node 110 includes one or more core processors 210(1)-(N) and a switch point 220, where each core processor 210 is connected to switch point 220 via an interconnect link coupled to an interface or "local" port of switch point 220. Core processor 210 and switch point 220 may each be referred to as a processing unit in the coherency network. Each core processor 210 is configured to access a shared memory space implemented in network 100. Although not shown, each core processor 210 may also be connected to one or more local caches in which the core processor 210 stores data of the shared memory space. Each core processor 210 also includes processing circuitry configured to implement coherency protocol, which includes being configured to provide a coherency response in response to a snoop request. Coherency protocol implemented in network 100 maintains memory coherence of the shared memory space, even as the core processors 210 read and write data in their respective caches across the network.

Switch point 220 also includes one or more interfaces or ports that are coupled to network 100 via one or more interconnect links or "network" ports that connect to other switch points 220 in network 100. As discussed above, each interconnect link includes a number of wires or electrical connections (e.g., one or more buses) over which messages, such as snoop requests and coherency responses are transmitted.

Switch point 220 also includes circuitry implementing a coherency logic module 230 and a coherency tracking table 235. Coherency logic module 230 is configured to track whether expected coherency responses for each outstanding snoop request have been received from neighboring ingress nodes (e.g., next-hop switch points), as defined by the particular directed spanning tree for the particular coherency network in which the outstanding snoop request originated. Coherency logic module 230 is also configured to incorporate each received coherency response (that are responsive to the same outstanding snoop request) into a single combined coherency response. Once all expected coherency responses have been incorporated, the combined coherency response is forwarded to a neighboring egress node (e.g., next-hop switch point), as defined by the particular directed spanning tree. Coherency logic module 230 is configured to update coherency tracking table 235 with the tracking information and the coherency responses, as further discussed below.

Coherency tracking table 235 is configured to store information indicating the status of each expected coherency response for each outstanding snoop request, as well as store the combined coherency response (or combined coherency response information) until all expected coherency responses have been received and incorporated into the combined coherency response. Coherency responses are further discussed below in connection with FIG. 3 and example coherency tracking tables are further discussed below in connection with FIGS. 5 and 7.

Figure 3:
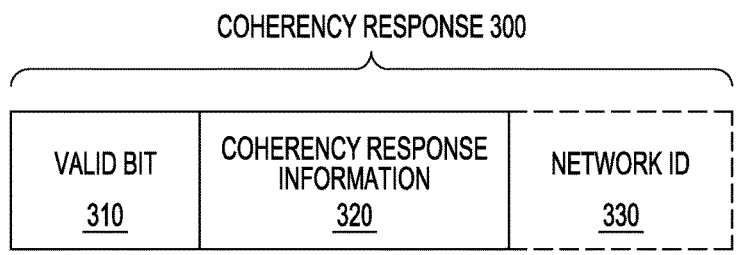
FIG. 3 illustrates a block diagram depicting a format of an example coherency response, according to some embodiments.

FIG. 3 illustrates a block diagram depicting a format of an example coherency response 300 implemented by the present disclosure. Coherency response 300 includes information responsive to a snoop request for data that has been transmitted to core processors in a coherency network. Coherency response 300 includes valid bit 310, coherency response information 320, and an optional network identifier (ID) 330. Valid bit 310 indicates that the coherency response is a valid message. Coherency response information 320 includes information generated by the responding core processor about the requested data in response to the outstanding snoop request. In some embodiments where a number of coherency networks are implemented in network 100, coherency response 300 also includes a network ID 330, indicating a coherency network to which the coherency response belongs. The generation of coherency responses is discussed below in connection with FIG. 4.

FIG. 4 illustrates a block diagram depicting an example directed spanning tree implemented in a particular coherency network. Core processors 210 are illustrated in FIG. 4 as "C" and switch points 220 are illustrated in FIG. 4 as "SP." A core processor is directly connected to a neighboring (or next-hop) switch point via the neighboring switch point's local port or interface. A switch point is connected to one or more core processors via one or more local ports of the switch point (e.g., SP13 has one local port connected to C13 and another local port connected to C14). A switch point is also connected to one or more other switch points in the coherency network via one or more network ports or interfaces of the switch point (e.g., SP10 has a respective network port connected to SP6, SP9, SP11, and SP14/OP1).

A directed spanning tree for a particular coherency network spans all processing units (e.g., core processors and switch points) included in the particular coherency network and has a particular processing unit (such as a switch point 220) designated as a "root" processing unit or ordering point (OP), which issues snoop requests into the particular coherency network. As illustrated in FIG. 4, a directed spanning tree for network 100 has a "root" processing unit at OP1 (which would otherwise be labeled SP14 on the bottom row, second element from the left) and branches that are illustrated by a number of arrows indicating flow direction of the coherency responses toward root OP1. Each core processor (e.g., C1, C13, C14) in the tree can be characterized as a "leaf" processing unit of the tree, and each switch point 220 in the tree can be characterized as a "trunk" processing unit of the tree. Coherency responses are generated by the leaf processing units of the tree, and are forwarded and combined along trunk processing units of the tree towards the root processing unit. A directed spanning tree is pre-defined and configured statically on each trunk (e.g., switch point) processing unit included in the particular coherency network at power up, indicating the flow direction for each of the trunk processing unit's local and network interfaces (e.g., ingress or egress). While coherency network 100 may include a number of coherency networks, each particular coherency network is associated with its own directed spanning tree, where each directed spanning tree is pre-defined and configured on the processing units that are included in the particular coherency network.

A coherency response 300 is generated by each core processor (e.g., C1, C13, C14) in response to an outstanding snoop request that is transmitted on a coherency network. Each core processor forwards the coherency response to a neighboring switch point (e.g., C1 to SP1, C13 and C14 to SP13) which is also a part of the (same) coherency network. Each switch point in the coherency network is configured to receive a set of one or more coherency responses (which are responsive to a same snoop request) from a set of ingress interfaces (as defined by the particular directed spanning tree for the coherency network) and combine the set into a single coherency response. The switch point's set of ingress interfaces includes at least one ingress interface (or ingress port), which may include the local ingress interface (e.g., the local port coupled to a next-hop core processor) and one or more of the ingress interfaces coupled to the coherency network (e.g., the network ports that are coupled to other switch points). In some embodiments, a core processor may not necessarily be included in every coherency network in which its directly-connected switch point is included. For example, assume that a first coherency network includes C6, SP6, and SP2, with SP6 having ingress interfaces from C6 and SP2, and that a second coherency network includes SP6 and SP2, where SP6 has an ingress interface from SP2. In such an example, SP6 may receive a coherency response for an outstanding snoop request in the first coherency network from C6 and SP2, while SP6 may only receive a coherency response for an outstanding snoop request in the second coherency network from SP2.

In one embodiment, a switch point stores an initially-received coherency response from a neighboring ingress node (e.g., from a next-hop core processor or switch point) in a new entry in a coherency tracking table or other buffer associated with the new entry of the coherency tracking table. The switch point then incorporates coherency response information from each subsequently-received coherency response (e.g., received from next-hop core processors or switch points) into the initially-received coherency response.

In another embodiment, a switch point stores the coherency response information of the initially-received coherency response in a new entry of a coherency tracking table and incorporates coherency response information from each subsequently-received coherency response into the coherency response information stored in the entry of the coherency tracking table. A new coherency response 300 is then generated by the switch point and the coherency response information stored in the entry is inserted into the new coherency response.

In both embodiments, the resulting coherency response is then forwarded on an egress interface (e.g., a next-hop switch point), according to the directed spanning tree (e.g., SP1 to SPS, SP13 to SP9). The entry in the coherency tracking table that stores the coherency response or coherency response information is then removed or invalidated. In this manner, coherency responses are combined at each switch point before being forwarded toward the root processing unit of the directed spanning tree. Once received at the root processing unit of the directed spanning tree (e.g., SP14), the root processing unit forwards the final combined coherency response to the core processor (which originated the outstanding snoop request) that is directly connected to the root processing unit's local port (e.g., C15).

FIG. 5 illustrates a block diagram depicting an example coherency tracking table 500 implemented on a switch point. As an example, table 500 illustrated in FIG. 5 is implemented on SP11, according to the directed spanning tree defined in FIG. 4. Coherency tracking table 500 includes a number of entries 545(1)-(N), where each entry tracks the receipt status of a set of coherency responses expected to be received on ingress interfaces of the switch point, as defined by the directed spanning tree. Each set of coherency responses are generated in response to a particular snoop request that is transmitted in the coherency network in which the switch point is located. In embodiments where coherency network 100 includes multiple coherency networks, a separate coherency tracking table 500 is implemented for each coherency network, where each table 500 is associated with the network ID of the coherency network. In such embodiments, the network ID is also included in received coherency responses and used to identify the proper table 500 for collecting the set of coherency responses.

A new entry 555 is added by coherency logic module 230 to table 500 upon receipt of an initially-received (e.g., a first received) coherency response for a corresponding snoop request, where the new entry is associated with the corresponding snoop request. Core processors generate and transmit coherency responses in the order that the corresponding snoop requests are issued and received by the core processors, also referred to as "snoop order." Similarly, coherency responses are received by switch points in the same snoop order. Since new entries corresponding to the coherency responses are added to table 500 on receipt of the coherency responses, the table entries are ordered in the same "snoop order" 550.

New entries 555 are added or pushed onto the top of existing table entries 545 in a first in first out (FIFO) manner, where table entries of recently received (e.g., newer) coherency responses are located closer to the top of the table and earlier received (e.g., older) coherency responses are located closer to the bottom of the table. For example, entry 545(1) includes a combined response A that is responsive to a snoop request A, entry 545(2) includes a combined response B that is responsive to a snoop request B, and entry 545(3) includes a combined response C that is response to a snoop request C. The corresponding table entries are added to table 500 in a same snoop order in which the responses were received (e.g., response A first, then response B, then response C last), which is the same snoop order that the snoop requests were issued and transmitted (e.g., snoop request A first, then snoop request B, then snoop request C).

Each entry includes a combined response 540. In some embodiments, combined response 540 includes a single coherency response into which information from one or more received coherency responses is incorporated. In other embodiments, combined response 540 includes coherency response information combined from one or more received coherency responses. When an initially-received coherency response is received, the coherency response or coherency response information (depending on the embodiment implemented) is stored as combined response 540 in the new entry.

Each entry 545 also includes a valid bit 510 that indicates the status of the entry, where valid entries indicate a present status of the set of coherency responses received for an outstanding snoop request. Valid bit 510 may be cleared (or the entry invalidated) once all expected coherency responses have been received and the combined response 540 is forwarded on the egress interface. Invalid entries are periodically removed from the coherency tracking table, where the entries above the invalid entry are moved or shifted down in the table.

Each entry 545 also includes one or more local interface bit fields 515, where each local interface bit field indicates the status of whether a coherency response has been received from a corresponding local ingress port of the switch point (e.g., from a core processor coupled to the switch point). Local bit 515 is set (e.g., logic high) when a coherency response has been received at the corresponding local ingress port, and is clear (e.g., logic low) when a coherency response has not yet been received at the corresponding local ingress port. One local bit 515 is illustrated in FIG. 5 since SP11 is coupled to a single core processor C11, as shown in FIG. 4. As another example, table entries on SP13 have two local bits, one for C13 and one for C14.

Each entry also includes one or more network interface bit fields, where each network interface bit field indicates the status of whether a coherency response has been received from a corresponding network ingress port of the switch point (e.g., from a neighboring switch point in the network that is coupled to the switch point). Since table 500 is an embodiment implemented on SP11 in the coherency network of FIG. 4, each entry includes four network interface bits that correspond to the four interfaces of SP11 that are each coupled to network nodes. In other words, the network interface bits reflect the topology of the network nodes (e.g., switch points) coupled to the particular switch point. In the embodiment illustrated in FIG. 5, each entry includes a west bit 520 corresponding to an interface coupled to SP10, an east bit 525 corresponding to an interface coupled to SP12, a north bit 530 corresponding to an interface coupled to SP7, and a south bit 535 corresponding to an interface coupled to SP15.

Based on the directed spanning tree of the particular coherency network associated with the coherency tracking table, one or more of the network interfaces are defined as ingress interfaces on which coherency responses are expected to be received, and one of the network interfaces is defined as an egress interface on which a combined coherency response is transmitted. The network interface bit corresponding to the egress interface as defined by the directed spanning tree for the particular coherency network is ignored. In this example, west bit 520 corresponds to the egress interface, and east bit 525, north bit 530, and south bit 535 each correspond to an ingress interface.

The local and network interface bit fields are also referred to herein as ingress interface bit fields that are each associated with a corresponding ingress interface. An ingress interface bit is set (e.g., logic high) by coherency logic module 230 in response to receipt of a coherency response on the corresponding interface of the switch point, and is clear (e.g., logic low) when a coherency response has not yet been received on the corresponding interface. For example, entry 545(1) indicates that a coherency response for snoop request A has been received from C11 (local bit 515 set), from SP12 (east bit 525 set), and from SP7 (north bit 530 set). Entry 545(2) indicates that a coherency response for snoop request B has been received from C11 and from SP7. Entry 545(3) indicates that a coherency response for snoop request C has also been received from C11 and from SP7.

When a coherency response is received on an ingress interface, coherency logic module 230 locates the appropriate entry in table 500 that will be updated with tracking information (e.g., the corresponding interface bit will be updated, or set, to reflect that the coherency response has been received). Since coherency responses are transmitted in the same snoop order as the issued snoop requests (i.e., coherency responses are not generated or processed out of snoop order), coherency logic module 230 will receive coherency responses on a given ingress interface in the same snoop order (e.g., each ingress interface will receive response A, then response B, then response C), even though the coherency responses may be received on different ingress interfaces at different times (e.g., the interface corresponding to north bit 530 has received responses A, B, and C, while the interface corresponding to south bit 535 has not yet received responses A, B, and C).

Since the table entries are in snoop order 550, coherency logic module 230 is configured to go to the oldest entry (or lowest or bottom-most entry) that has the corresponding network interface bit as clear (i.e., the entry that corresponds to the earliest outstanding snoop request), which is the next response in snoop order expected from that interface. For example, if a coherency response is received from SP12 (corresponding to east bit 525), coherency logic module 230 locates entry 545(2) as the bottom-most entry having a cleared east bit 525. Coherency logic module 230 then updates the entry by setting east bit 525 and incorporating the received coherency response into the existing combined response 540, response B.

After updating the entry, coherency logic module 230 then checks the entry to determine whether coherency responses have been received from all ingress interfaces, as defined by the directed spanning tree. In other words, when all network interface bits corresponding to the ingress interfaces are set (e.g., logic high) and all responses received on the ingress interfaces have been incorporated into combined response 540, the combined response 540 is ready for transmission on the egress interface. Once transmitted, the entry is invalidated and removed from table 500, and all entries of the table are shifted down.

FIG. 6 illustrates a block diagram depicting another example directed spanning tree implemented in a particular coherency network. Core processors 210 are illustrated as "C" and switch points 220 are illustrated as "SP." A directed spanning tree is illustrated in FIG. 6 having a root or ordering point at OP2 (which would otherwise be labeled SP8 on the second row from the top, last element from the left) and branches that are illustrated by a number of arrows indicating flow direction of the coherency responses from leaves of the tree (or core processors) toward root OP2.

Figures 7, 8:
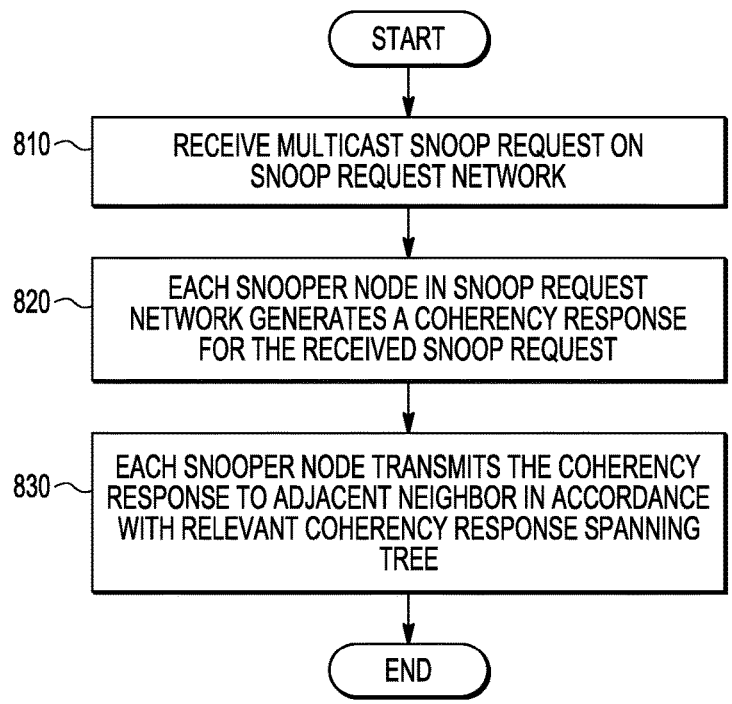
FIG. 7 illustrates a block diagram depicting another example coherency tracking table, according to some embodiments.
FIG. 8 illustrates a flowchart depicting a coherency response generation process in which the disclosure is implemented, according to some embodiments.

FIG. 7 illustrates a block diagram depicting another example coherency tracking table 700 implemented on a switch point. As an example, table 700 illustrated in FIG. 7 is implemented on SP3, according to the directed spanning tree defined in FIG. 6. Coherency tracking table 700 includes a number of entries 745(1)-(N), where each entry includes valid bit 510, local bit 515, and interface bits of west bit 520, east bit 525, and south bit 535, as discussed above in connection with FIG. 5. Table 700 reflects the topology of SP3, which does not have a node coupled to a "north" interface and does not include a corresponding north bit. New table entries 755 are also added to table 700 in snoop order 750. Each table entry is associated with a snoop request, where a corresponding combined response 540 is responsive to the snoop request.

FIG. 8 illustrates a flowchart depicting a coherency response generation process in which the disclosure is implemented. The process illustrated in FIG. 8 is implemented by processing circuitry of snooper nodes, such as core processors or other network devices configured to perform snooping, in network 100, where the snooper nodes may each be included in one or more coherency networks. The process begins at operation 810, where a snooper node receives a multicast snoop request on a snoop request network, which is the coherency network in which the snoop request is originated. The snoop request is multicast to those snooper nodes included in the particular snoop request network, which avoids sending the snoop request to snooper nodes in network 100 that are not included in the particular snoop request network. The process continues to operation 820, where each snooper node in the snoop request network generates a coherency response for the received snoop request. The process continues to operation 830, where each snooper node transmits the coherency response to an adjacent neighbor (e.g., switch point) in accordance with the relevant coherency response directed spanning tree. The process then ends.

Figure 9:
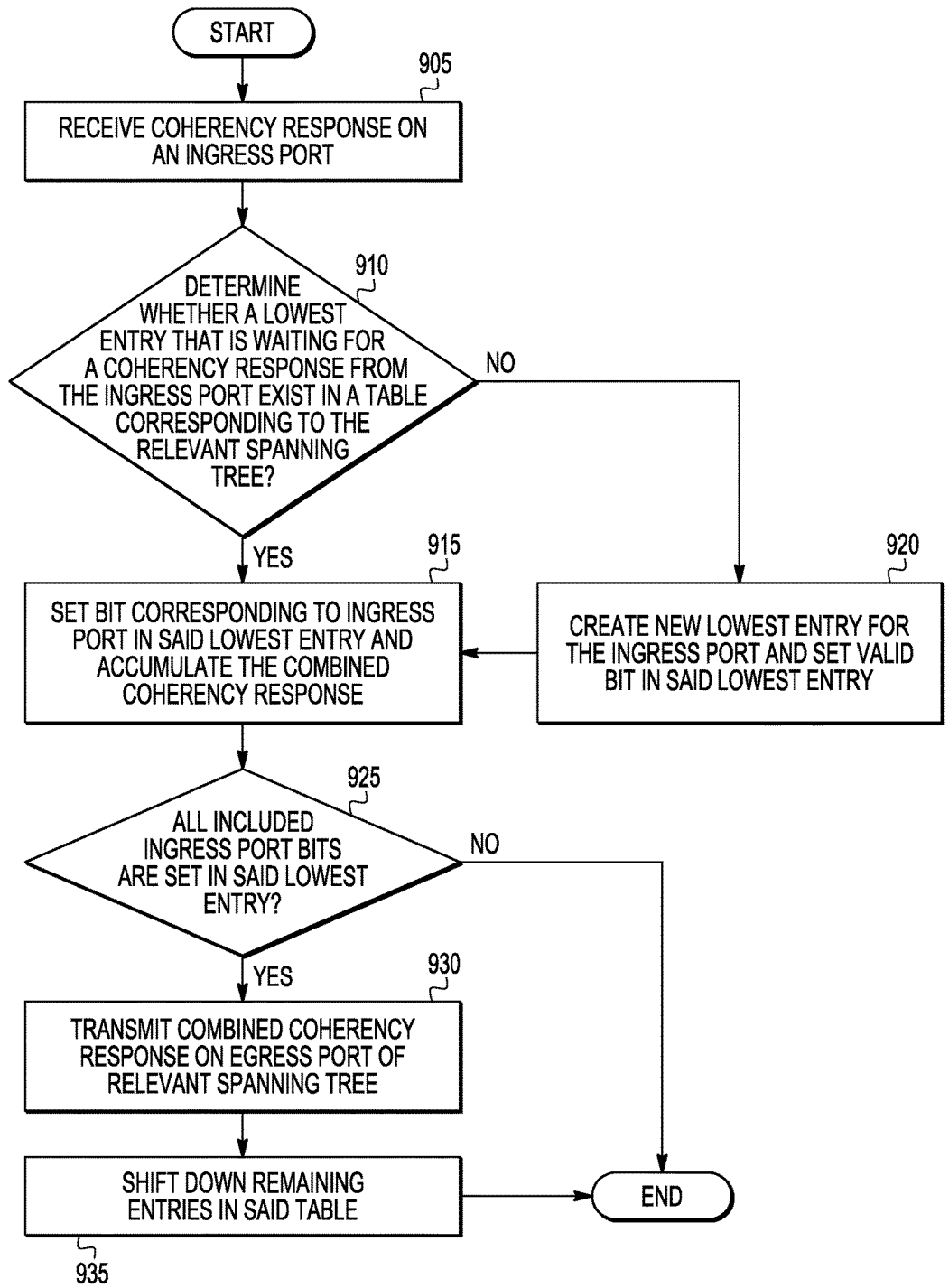
FIG. 9 illustrates a flowchart depicting a coherency response combination and transmission process in which the disclosure is implemented, according to some embodiments.

FIG. 9 illustrates a flowchart depicting a coherency response combination and transmission process in which the disclosure is implemented. The process illustrated in FIG. 9 is implemented by switch point circuitry including a coherency logic module. The process begins at operation 905, where a coherency response is received on an ingress port or interface of the switch point circuitry coupled to a coherency network.

The process continues to operation 910, where coherency logic module of the switch point circuitry determines whether a lowest entry that is waiting for a coherency response from the ingress port exists in a coherency tracking table corresponding to the relevant directed spanning tree. In embodiments where a single coherency network is implemented, a single directed spanning tree is implemented in the coupled coherency network, where a single coherency tracking table corresponds to the coherency network. In embodiments where multiple coherency networks are implemented, the coherency response includes a network ID that is associated with a particular coherency network. The network ID is used to identify a coherency tracking table that corresponds to the directed spanning tree implemented in that particular coherency network.

Once the corresponding coherency tracking table is identified, coherency logic module determines whether the table includes an entry that has not accumulated the next coherency response received on the ingress port, as indicated by the entry's interface bit corresponding to the ingress port being clear. If such an entry does not yet exist (e.g., there are no valid entries in the table that have the ingress port's corresponding interface bit clear), the process continues to operation 920, where coherency logic module creates a new lowest entry for the coherency response (e.g., by adding the new lowest entry to the top of the table) and sets the valid bit in the new lowest entry. The process continues to operation 915, where coherency logic module sets the interface bit corresponding to the ingress port in the new lowest entry and accumulates the combined coherency response into the lowest entry. The process continues to operation 925, discussed below.

Returning to operation 910, if a lowest entry exists, the process continues to operation 915, where coherency logic module sets the interface bit corresponding to the ingress port in the lowest entry and accumulates the received coherency response into the combined coherency response of the lowest entry.

The process continues to operation 925, where coherency logic module determines whether all included ingress port bits are set in the lowest entry. If not, the process then ends and the switch point circuitry waits for a next received coherency response. If all ingress port bits are set in the entry, the process continues to operation 930, where switch point circuitry transmits the combined coherency response on an egress port, according to the relevant directed spanning tree. In some embodiments, the entry includes the response itself, which is then transmitted. In other embodiments, the entry includes response information that is inserted into a coherency response and then transmitted. The process continues to operation 935, where coherency logic module shifts down the remaining entries in the identified table. In other embodiments, coherency logic module may invalidate the entry in the identified table and shift down the remaining entries at a later time. The process then ends.

By now it should be appreciated that there has been provided an efficient accumulation and transmission mechanism for coherency responses in a coherency network. In one embodiment of the present disclosure, a data processing system is provided, which includes a plurality of processing units interconnected by a coherency network in accordance with a directed spanning tree in which the plurality of processing units includes a first processing unit characterized as a root of the directed spanning tree, a first set of processing units each characterized as a leaf of the directed spanning tree, and a remaining set of processing units, exclusive of the first processing unit and first set of processing units. Each processing unit of the first set includes processing circuitry configured to provide a coherency response in response to a snoop request. Each processing unit of the remaining set includes switch point circuitry having one or more ingress ports coupled to neighboring processing units in accordance with the directed spanning tree, wherein the switch point circuitry includes a coherency tracking table configured to store a combined coherency response in response to a particular snoop request based on one or more coherency responses received at the one or more ingress ports from the neighboring processing units.

One aspect of the above embodiment provides that the one or more coherency responses received at the one or more ingress ports are provided in response to the particular snoop request and the one or more coherency responses are used to form the combined coherency response.

Another aspect of the above embodiment provides that the one or more coherency responses are received at different times.

Another aspect of the above embodiment provides that the coherency tracking table of each switch point circuitry in the remaining set of processing units includes a plurality of entries, each entry is associated with a corresponding snoop request and is configured to store: a bit field associated with a corresponding ingress port of the one or more ingress ports to indicate whether a corresponding coherency response has been received for the corresponding snoop request on the corresponding ingress port, and a combined coherency response field that is updated when a new coherency response is received at the one or more ingress ports for the corresponding snoop request.

A further aspect provides that the plurality of entries are ordered in accordance with an order in which the corresponding snoop requests were issued.

Another aspect of the above embodiment provides that each switch point circuitry of the remaining set of processing units includes an egress port toward the first processing unit characterized as the root of the directed spanning tree, wherein the egress port is coupled to the coherency network, and coherency logic, wherein the coherency logic is configured to provide the combined coherency response for the particular snoop request on the egress port when a corresponding coherency response for the particular snoop request has been received from every one of the neighboring processing units in accordance with the directed spanning tree.

A further aspect provides that the egress port is coupled to an immediately adjacent processing unit in the coherency network, exclusive of the first set of processing units.

Another aspect of the above embodiment provides that the one or more coherency responses includes at least one or more of: a received combined coherency response from a neighboring one of the remaining set of processing units in accordance with the directed spanning tree, and a received coherency response from a neighboring one of the first set of processing units in accordance with the directed spanning tree.

Another aspect of the above embodiment provides that the data processing system further includes a second plurality of processing units interconnected by a second coherency network in accordance with a second directed spanning tree that is different from the first directed spanning tree, where the first plurality of processing units and the second plurality of processing units include an overlapping set of processing units.

A still further aspect provides that each processing unit of the overlapping set of processing units includes switch point circuitry including: a first coherency tracking table configured to store combined coherency responses in response to corresponding snoop requests communicated on the coherency network; and a second coherency tracking table configured to store combined coherency responses in response to corresponding snoop requests communicated on the second coherency network.

A still further aspect provides that the switch point circuitry in each processing unit of the overlapping set of processing units includes a first set of ingress ports coupled to the coherency network and a second set of ingress ports coupled to the second coherency network.

In another embodiment of the present disclosure, a data processing system is provided, which includes a coherency network; an ordering point processing unit; and a plurality of processing units. The ordering point processing unit and the plurality of processing units are interconnected by the coherency network, wherein the plurality of processing units includes a set of trunk processing units, where each of the set of trunk processing units includes switch point circuitry having one or more ingress ports coupled to the coherency response network. The switch point circuitry includes a coherency tracking table configured to store a combined coherency response in response to a particular snoop request based on one or more coherency responses received at the one or more ingress ports.

One aspect of the above embodiment provides that the one or more coherency responses received at the one or more ingress ports are provided in response to the particular snoop request and the one or more coherency responses are used to form the combined coherency response.

Another aspect of the above embodiment provides that the one or more coherency responses are received at different times.

Another aspect of the above embodiment provides that the coherency tracking table of each switch point circuitry in the plurality of processing units includes: a plurality of entries, each entry is associated with a corresponding snoop request and is configured to store: a bit field associated with a corresponding ingress port of the one or more ingress ports to indicate whether a corresponding coherency response has been received for the corresponding snoop request on the corresponding ingress port, and a combined coherency response field that is updated when a new coherency response is received at the one or more ingress ports for the corresponding snoop request.

Another further aspect provides that the plurality of entries are ordered in accordance with an order in which the corresponding snoop requests were issued by the ordering point processing unit.

Another aspect of the above embodiment provides that each switch point circuitry of the plurality of processing units includes an egress port toward the ordering point processing unit, where the egress port is coupled to the coherency network, and coherency logic, wherein the coherency logic is configured to provide the combined coherency response for the particular snoop request on the egress port when a corresponding coherency response for the particular snoop request has been received from every one of the one or more ingress ports.

In another embodiment of the present disclosure, a method is provided in a data processing system having multiple processing units interconnected via a coherency network in accordance with a directed spanning tree, the method including: receiving, at a processing unit from a first neighboring processing unit in accordance with the directed spanning tree, a coherency response in response to a first snoop request; and updating a first entry corresponding to the first snoop request in a coherency tracking table of the processing unit, where the updating includes accumulating the received coherency response with a combined coherency response stored within the first entry; and providing to a second neighboring processing unit in accordance with the directed spanning tree the combined coherency response from the first entry.

One aspect of the above embodiment provides that the coherency response received at the processing unit is a combined coherency response for the first snoop request including accumulated coherency responses received at the first neighboring processing unit from one or more neighboring processing units of the first neighboring processing unit in accordance with the directed spanning tree.

Another aspect of the above embodiment provides that the method further includes: receiving, at the processing unit from each of one or more neighboring processing units in accordance with the directed spanning tree, a coherency response in response to the first snoop request. The method also includes, upon receiving each coherency response from the one or more neighboring processing units, accumulating each received coherency response with the combined coherency response of the first entry. Providing the combined coherency response from the first entry to the second neighboring processing unit in accordance with the directed spanning tree is performed after receiving a coherency response to the first snoop request from all of the one or more neighboring processing units and accumulating each received coherency response with the combined coherency response of the first entry.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
a plurality of processing units interconnected by a coherency network in accordance with a directed spanning tree in which the plurality of processing units comprises a first processing unit characterized as a root of the directed spanning tree, a first set of processing units each characterized as a leaf of the directed spanning tree, and a remaining set of processing units, exclusive of the first processing unit and first set of processing units, wherein
each processing unit of the first set comprises:
processing circuitry configured to provide a coherency response in response to a snoop request, and
each processing unit of the remaining set comprises:
switch point circuitry comprising:
one or more ingress ports coupled to neighboring processing units in accordance with the directed spanning tree,
a coherency tracking table configured to store a combined coherency response in response to a particular snoop request based on one or more coherency responses received at the one or more ingress ports from the neighboring processing units,
an egress port toward the first processing unit characterized as the root of the directed spanning tree, wherein the egress port is coupled to the coherency network, and
coherency logic configured to provide the combined coherency response for the particular snoop request on the egress port when a corresponding coherency response for the particular snoop request has been received from every one of the neighboring processing units in accordance with the directed spanning tree.

2. The data processing system of claim 1, wherein the one or more coherency responses received at the one or more ingress ports are provided in response to the particular snoop request and the one or more coherency responses are used to form the combined coherency response.

3. The data processing system of claim 1, wherein the one or more coherency responses are received at different times.

4. The data processing system of claim 1, wherein the coherency tracking table of each switch point circuitry in the remaining set of processing units comprises:
a plurality of entries, each entry is associated with a corresponding snoop request and is configured to store:
a bit field associated with a corresponding ingress port of the one or more ingress ports to indicate whether a corresponding coherency response has been received for the corresponding snoop request on the corresponding ingress port, and
a combined coherency response field that is updated when a new coherency response is received at the one or more ingress ports for the corresponding snoop request.

5. The data processing system of claim 4, wherein the plurality of entries are ordered in accordance with an order in which the corresponding snoop requests were issued.

6. The data processing system of claim 1, wherein the egress port is coupled to an immediately adjacent processing unit in the coherency network, exclusive of the first set of processing units.

7. The data processing system of claim 1, wherein the one or more coherency responses comprises at least one or more of: a received combined coherency response from a neighboring one of the remaining set of processing units in accordance with the directed spanning tree, and a received coherency response from a neighboring one of the first set of processing units in accordance with the directed spanning tree.

8. The data processing system of claim 1, further comprising:
a second plurality of processing units interconnected by a second coherency network in accordance with a second directed spanning tree that is different from the first directed spanning tree, wherein the first plurality of processing units and the second plurality of processing units include an overlapping set of processing units.

9. The data processing system of claim 8, wherein each processing unit of the overlapping set of processing units comprises switch point circuitry including:
a first coherency tracking table configured to store combined coherency responses in response to corresponding snoop requests communicated on the coherency network; and
a second coherency tracking table configured to store combined coherency responses in response to corresponding snoop requests communicated on the second coherency network.

10. The data processing system of claim 9, wherein the switch point circuitry in each processing unit of the overlapping set of processing units includes a first set of ingress ports coupled to the coherency network and a second set of ingress ports coupled to the second coherency network.

11. A data processing system, comprising:
a coherency network;
an ordering point processing unit; and
a plurality of processing units, wherein the ordering point processing unit and the plurality of processing units are interconnected by the coherency network, wherein the plurality of processing units comprises a set of trunk processing units, wherein
each of the set of trunk processing units comprises:
switch point circuitry comprising:
one or more ingress ports coupled to the coherency network,
a coherency tracking table configured to store a combined coherency response in response to a particular snoop request based on one or more coherency responses received at the one or more ingress ports,
an egress port toward the ordering point processing unit, wherein the egress port is coupled to the coherency network, and
coherency logic configured to provide the combined coherency response for the particular snoop request on the egress port when a corresponding coherency response for the particular snoop request has been received from every one of the one or more ingress ports.

12. The data processing system of claim 11, wherein the one or more coherency responses received at the one or more ingress ports are provided in response to the particular snoop request and the one or more coherency responses are used to form the combined coherency response.

13. The data processing system of claim 11, wherein the one or more coherency responses are received at different times.

14. The data processing system of claim 11, wherein the coherency tracking table of each switch point circuitry in the plurality of processing units comprises:
    a plurality of entries, each entry is associated with a corresponding snoop request and is configured to store:
        a bit field associated with a corresponding ingress port of the one or more ingress ports to indicate whether a corresponding coherency response has been received for the corresponding snoop request on the corresponding ingress port, and
        a combined coherency response field that is updated when a new coherency response is received at the one or more ingress ports for the corresponding snoop request.

15. The data processing system of claim 14, wherein the plurality of entries are ordered in accordance with an order in which the corresponding snoop requests were issued by the ordering point processing unit.

16. In a data processing system having multiple processing units interconnected via a coherency network in accordance with a directed spanning tree, a method comprising:
    receiving, at a processing unit from each of one or more ingress neighboring processing units in accordance with the directed spanning tree, a corresponding coherency response responsive to a first snoop request;
    updating a first entry corresponding to the first snoop request in a coherency tracking table of the processing unit, wherein the updating comprises accumulating each corresponding coherency response into a combined coherency response stored within the first entry; and
    providing to an egress neighboring processing unit in accordance with the directed spanning tree the combined coherency response from the first entry, wherein the providing is performed after each corresponding coherency response to the first snoop request has been received from all of the one or more ingress neighboring processing units and accumulated into the combined coherency response of the first entry.

17. The method of claim 16, wherein a first coherency response of the corresponding coherency responses received at the processing unit is a combined coherency response for the first snoop request comprising accumulated coherency responses received at a first ingress neighboring processing unit of the one or more ingress neighboring processing units, wherein the accumulated coherency responses were received from another set of one or more ingress neighboring processing units of the first ingress neighboring processing unit in accordance with the directed spanning tree.

\* \* \* \* \*